US011391483B2

(12) United States Patent
Hediger et al.

(10) Patent No.: US 11,391,483 B2
(45) Date of Patent: Jul. 19, 2022

(54) AUTOMATIC ASSIGNMENT BETWEEN FLOW CONTROL DEVICES, SENSOR DEVICES AND CONTROL DEVICES IN AN HVAC APPLICATION

(71) Applicant: BELIMO HOLDING SA, Hinwil (CH)

(72) Inventors: Michael Hediger, Jona (CH); Peter Schmidlin, Uster (CH); Benedikt Ostermaier, Uster (CH); Jan-Hinrich Hauer, Dubendorf (CH)

(73) Assignee: BELIMO HOLDING SA, Hinwil (CH)

( * ) Notice: Subject to any disclaimer, the term of this patent is extended or adjusted under 35 U.S.C. 154(b) by 3 days.

(21) Appl. No.: 16/643,031

(22) PCT Filed: Aug. 20, 2018

(86) PCT No.: PCT/IB2018/056282
§ 371 (c)(1),
(2) Date: Feb. 28, 2020

(87) PCT Pub. No.: WO2019/043500
PCT Pub. Date: Mar. 7, 2019

(65) Prior Publication Data
US 2020/0208866 A1 Jul. 2, 2020

(30) Foreign Application Priority Data

Aug. 30, 2017 (CH) ...................................... 01074/17

(51) Int. Cl.
*F24F 11/63* (2018.01)
*G05B 19/042* (2006.01)
(52) U.S. Cl.
CPC ............ *F24F 11/63* (2018.01); *G05B 19/042* (2013.01); *G05B 2219/2614* (2013.01)

(58) Field of Classification Search
CPC ................... F24F 11/63; G05B 19/042; G05B 2219/2614; G05B 2219/2642; G05B 15/02
(Continued)

(56) References Cited

U.S. PATENT DOCUMENTS 6,667,690 B2  12/2003  Durej et al.
7,117,129 B1  10/2006  Bash et al.
(Continued)

FOREIGN PATENT DOCUMENTS

EP  3156858 A1  4/2017
WO  2017031033 A1  2/2017

OTHER PUBLICATIONS

International Search Report for PCT/IB2018/056282 dated Jan. 3, 2019.
Written Opinion for PCT/IB2018/056282 dated Jan. 3, 2019.

*Primary Examiner* — Michael W Choi
(74) *Attorney, Agent, or Firm* — Pearne & Gordon LLP

(57) ABSTRACT

HVAC system for a building with a control, including a model containing representations of HVAC devices and control devices, assignments between the representations of HVAC devices and control devices, and representations of fluid control devices and sensor devices. A configuring section can: cause one of several fluid control devices to vary a fluid control parameter; determine a variation of a sensor parameter at one of several sensor devices caused by variation of the fluid control parameter; compare the determined sensor device with the model to detect the representation of sensor device(s) corresponding to the sensor device determined; assign the sensor device determined to one of the control devices corresponding to a representation of control devices assigned to the representation of the sensor device corresponding to the sensor device determined and/or (Continued)

assigned to the representation of the fluid control device for which the fluid control parameter has been varied.

14 Claims, 4 Drawing Sheets

(58) Field of Classification Search
USPC .......................................................... 700/276
See application file for complete search history.

(56) References Cited

U.S. PATENT DOCUMENTS

| | | |
|---|---|---|
| 2005/0278047 A1 | 12/2005 | Ahmed |
| 2006/0206291 A1 | 9/2006 | Bash et al. |
| 2008/0231437 A1 | 9/2008 | Singhal et al. |
| 2011/0115816 A1 | 5/2011 | Brackney |
| 2017/0293273 A1* | 10/2017 | Slupik ..................... H04W 4/33 |
| 2018/0195749 A1* | 7/2018 | Sinha ....................... F24F 11/63 |
| 2018/0217621 A1* | 8/2018 | Biesterveld ........ G05D 23/1934 |
| 2018/0351758 A1* | 12/2018 | Becker ................ H04L 12/2827 |

* cited by examiner

AUTOMATIC ASSIGNMENT BETWEEN FLOW CONTROL DEVICES, SENSOR DEVICES AND CONTROL DEVICES IN AN HVAC APPLICATION

FIELD OF THE INVENTION

The present invention concerns a method, system and computer program for an HVAC application in a building structure for obtaining an automatic assignment between flow control devices, sensor devices and control devices.

DESCRIPTION OF RELATED ART

Heating, Ventilation and Air Conditioning (HVAC) systems include a large number of HVAC devices like actuators, sensors, controllers, interfaces, fluid flow generation devices, etc. Those HVAC devices are controlled in a hierarchic structure. Traditionally those HVAC devices are connected by a field bus which transfers the hierarchic information necessary for configuring the hierarchic control structure of the HVAC system.

When the field bus is replaced by networks without such hierarchic information like a (wireless) local area network (W)LAN, the hierarchic information for each HVAC device must be inserted manually which is time consuming and error-prone, in particular when the number of HVAC devices is high. For example U.S. Pat. No. 6,667,690 discloses a method to identify each HVAC device by reading with a mobile device a near field communication (NFC) code of the HVAC device and assign in the mobile device a suitable network address and location to each HVAC device. The control structure will then contact the HVAC devices with the information received from the mobile device. The required input from the service person is time-consuming and error-prone.

U.S. Pat. No. 7,117,129 discloses a Computer Room Air Conditioning (CRAC) system with a plurality of actuators and a plurality of sensors distributed in the computer room to be cooled. An actuator position is varied and a correlation index between the actuator and the sensors is determined in order to assign a number of sensors to a CRAC unit. However, this solution is complex. Furthermore, this solution is also time-consuming, because for each measurement, it is necessary to wait until the varied actuator position takes effect in the computer room environment. In addition, CRAC applications have a completely different control and sensor structure such that CRAC solutions are normally not applicable in standard HVAC applications as used in standard facility management.

BRIEF SUMMARY OF THE INVENTION

It is object to improve the assignment of HVAC devices to control devices of a control structure in HVAC systems, in particular when non-hierarchical networks are used to connect the HVAC devices to the control structure.

According to the invention, these aims are achieved by means of the method, system and computer program according to the independent claims.

By varying a fluid control parameter in a fluid control device, a variation of a sensor parameter can be detected in the at least one sensor device related to the fluid control device. This allows to automatically determine an assignment between a sensor device and/or a fluid control device and at least one control device. This could be used to check if the user input is correct or to self-configure the HVAC devices of a HVAC system.

The dependent claims refer to further advantageous embodiments.

In one embodiment, the use of sensor devices in the conduit system of the HVAC system, in particular of fluid flow measurement sensor devices, has the advantage that the consequence of the variation of the fluid control parameter can be detected in a very short time and with high reliability.

In one embodiment, the determined assignment information between a fluid control device and at least one sensor device is used to check the correctness of a user input for the commissioning of the HVAC devices. This allows to detect errors in the configuration immediately.

In one embodiment, the solution for errors detected in the configuration is shown to a user in an augmented reality of the building complex, e.g. the location of the HVAC device.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
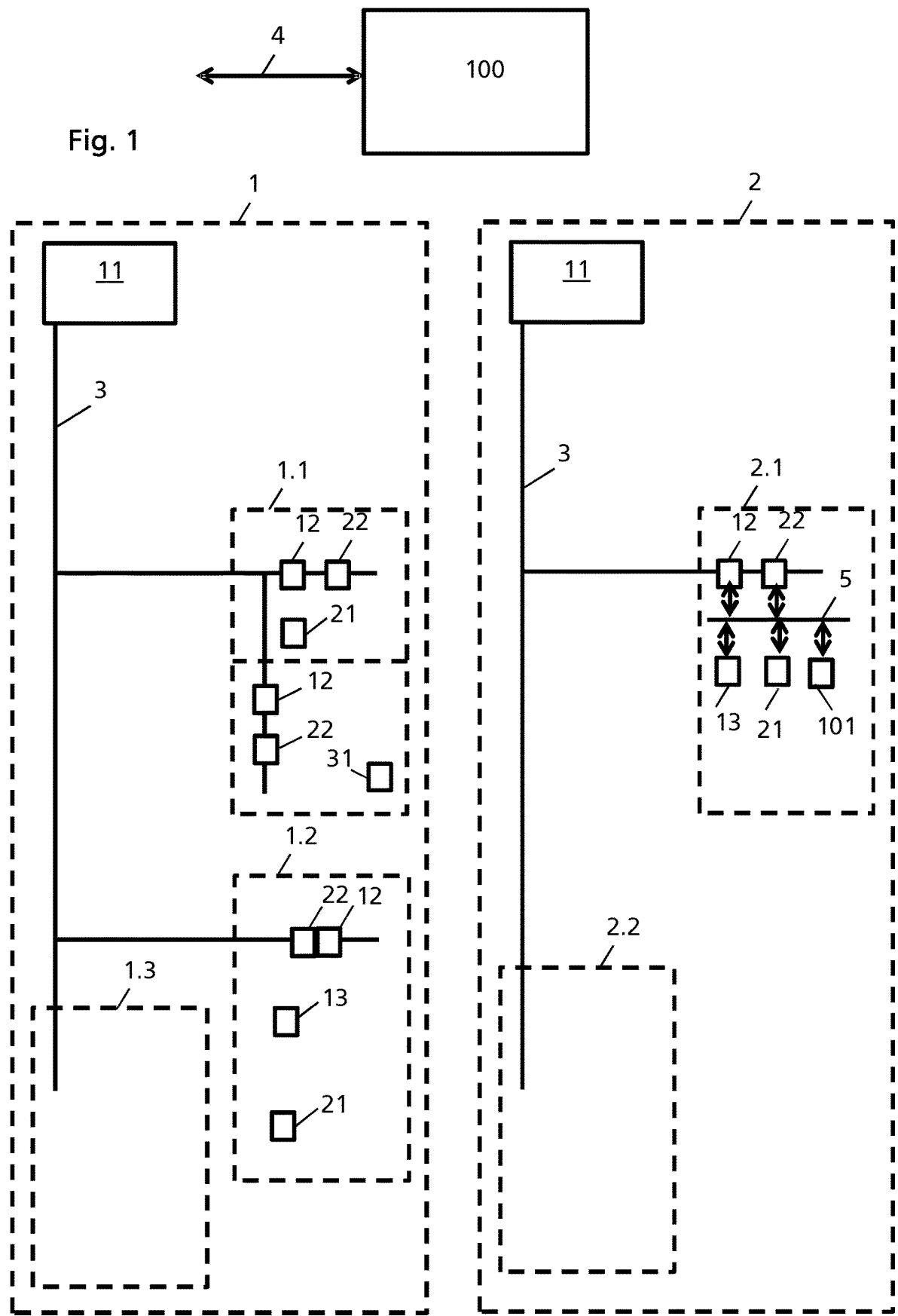
FIG. 1 shows an embodiment of a conduit system of an HVAC system.

FIG. 1 shows an exemplary embodiment of the HVAC system. The HVAC system comprises a control structure 100, a plurality of HVAC devices, a conduit system 3 and a communication network 4.

The HVAC system is installed in a building structure. A building structure could be a room, an apartment, a floor, a building, a campus with multiple buildings, etc. Preferably, the building structure comprises at least two units. The building structure could be a campus and each unit could be a building. The building structure could be a building and the units could be floors or apartments. Each of the units or at least some of them could comprise at least two sub-units. The unit could be a building and the sub-unit a floor or an apartment or another sub-unit of the building. The unit could also be an apartment or an office and the sub-units could refer to different rooms or zones. Also the sub-unit could be divided in different zones. For example, an apartment or an office as sub-unit could comprise different rooms as zones. In FIG. 1, an exemplary building structure is shown with two units or buildings 1 and 2. The first building 1 has a first sub-unit or apartment 1.1, a second sub-unit or apartment 1.2 and a third sub-unit or apartment 1.3. The second building 2 has a first sub-unit or apartment 2.1 and a second sub-unit or apartment 2.2. The first sub-unit or apartment 1.1 shows two rooms or zones. The invention works with any other number of buildings, apartments, zones and/or with any other type of building structure. In the following embodiments, units are described often as being buildings, however it should be understood that in the present invention the units are not restricted to being buildings. In the following embodiments, sub-units are described often as being apartments, however it should be understood, that in the present invention the sub-units are not restricted to being apartments. In the following embodiments, zones are described often as being rooms, however it should be understood that in the present invention the zones are not restricted to being rooms.

The conduit system 3 conducts a HVAC fluid through the building structure. The HVAC fluid could be, for example, water, or air, or any other heating or cooling fluid. The conduit system 3 is preferably a pipe system. The conduit system 3 can comprise at least two independent conduit portions. Independent conduit portions could be one, two or more out of the following applications: a supply air conduit portion, an exhaust air conduit portion, a heating conduit portion, a cooling conduit portion, etc. Two independent conduit portions could be two conduit portions of the same or of different applications.

The HVAC devices comprise fluid control devices 11, 12 and 13 and sensor devices 21, 22. Each of said HVAC devices are configured to communicate over the communication network 4 with the control structure 100. "Communicate" can mean a one- or bi-directional communication. For example, a sensor device 21, 22 could communicate only from the sensor device 21, 22 to the control structure 100 or a control structure 100 could communicate only from the control structure 100 to the fluid control device 11, 12, 13. Preferably, the communication between the HVAC devices is bi-directional. In one embodiment, each HVAC device comprises an identifier (identification code) which can be read by a mobile device (e.g. for the registration step S2 in FIG. 3). The identifier is preferably configured to be readable without powering the HVAC device. This identifier could be an optical code (like a QR code) or an RFID tag, in particular a NFC tag.

The fluid control devices 11, 12, 13 are configured to control fluid control parameters in the conduit system 3.

The fluid control devices 11, 12, 13 comprise normally at least one fluid flow generation device 11 for generating a fluid flow in the conduit system 3. This could be for example a fan or a pump. In one embodiment, each unit or building comprises at least one conduit portion with at least one fluid flow generation device 11. Preferably, each unit or building comprises at least two conduit portions and at least two fluid flow generation devices 11, each of the at least two fluid flow generation devices 11 corresponding to one of the at least two conduit portions. FIG. 1 shows, for simplicity, one fluid flow generation device 11 for each building 1 and 2. The fluid control parameter is for example the speed of the fan or the fluid, throughput of fluid such as the pump volume, etc. Preferably, each fluid flow generation device 11 is coupled to a distinct conduit portion which is independent of the other conduit portion(s).

The fluid control devices normally comprise a plurality of actuators 12 for controlling a fluid flow in a part of the conduit system 3. The actuator 12 normally controls the opening state of a flap or a valve, and has as fluid control parameter such as, for example, the opening state (angle, position) or the velocity/volume of the fluid. Alternative or additional fluid control parameters of an actuator 12 could be the temperature, $CO_2$ content, etc. Building 1 comprises actuators 12 for controlling the fluid flow in different rooms or zones in the apartment 1.1. The function of the actuator 12 was described here as controlling the function of the HVAC system downstream of the actuator 12.

Some fluid control devices could involve other functions like closing the conduit for fire protection in case of fire alarm. The fluid control devices could also comprise an input device, such as a room controller for example, for changing HVAC parameters like temperature, flow strength, humidity, etc. Obviously there are many more fluid control devices like heating devices, cooling devices, humidifying devices, etc. which can control fluid control parameters in the conduit system 3 to which the present invention can be applied.

A variation of a fluid control parameter of a fluid control device can be detected by all sensor devices 21, 22 which are arranged downstream of the fluid control parameter and sometimes also arranged upstream of the fluid control parameter (if the sensor parameter is influenced by the fluid control parameter). "Arrangement" or "position" of a fluid control device 11, 12, 13 refers here not to the actual location of the fluid control device, but to the position in the conduit system 3 where the fluid is controlled. In contrast the term "locate" or "location" refers to the actual physical location of the fluid control device in the building structure.

A sensor device 21, 22 is configured to sense a sensor parameter in the HVAC system. The sensor device 21, 22 could also sense multiple different sensor parameters. The sensor parameter of a sensor device is influenced by a certain group of fluid control devices 11, 12, 13. The sensor devices 21, 22 comprise a plurality of fluid flow sensors 22 arranged in the conduit system 3 for sensing the flow of the fluid in the conduit system 3 at the sensor position. The fluid flow sensors 22 could measure any sensor parameter indicating the fluid flow, such as differential pressure, velocity of a fan, etc. The fluid flow sensor 22 can detect all variations of the fluid flow at all fluid flow control devices 11, 12 arranged upstream of the fluid flow sensor 12. The sensor devices could comprise other sensor devices like a temperature sensor 21. The temperature sensor 21 is preferably arranged in the environment which is to be controlled by the HVAC system, e.g. a room, a zone, an apartment, etc.

It is also possible that some HVAC devices have the function of a fluid control device and a sensor device. E.g. there are room controllers 31 which measure the temperature and serve as user input. Those combined HVAC devices could be treated in the later described method as fluid control devices and/or as sensor devices.

Each HVAC device is connected via the communication network 4 with the control structure 100. The communication network 4 could comprise also multiple networks. The communication network 4 is preferably an internal network like a (wireless) local area network ((W)LAN), LoRa network, an Ethernet, etc. However, other communication networks 4 like internet, mobile phone network, etc. are also possible. In a preferred embodiment, the communication network 4 is a network which does not include all hierarchical information for automatically configuring the HVAC devices in contrast to field buses. In one embodiment, each HVAC device or at least some of them is/are connected directly to the communication network 4. In another embodiment, the HVAC devices are connected over another device to the communication network 4. In one embodiment, at least two HVAC devices are connected to each other by another communication connection (e.g. a field bus 5), and are connected over an interface device 101 which connects said other communication connection (e.g. the field bus 5) with the communication network 4. For example in apartment 2.1, the HVAC devices 12, 22, 13, 21 are connected over a field bus 5 to the interface device 101 which establishes the network connection to the control structure 100.

The control structure 100 is configured to control the HVAC devices of the HVAC system such that the desired HVAC function is achieved. In one embodiment, the control structure 100 comprises a plurality of control devices which take over different control functions of the control structure 100.

Figure 2:
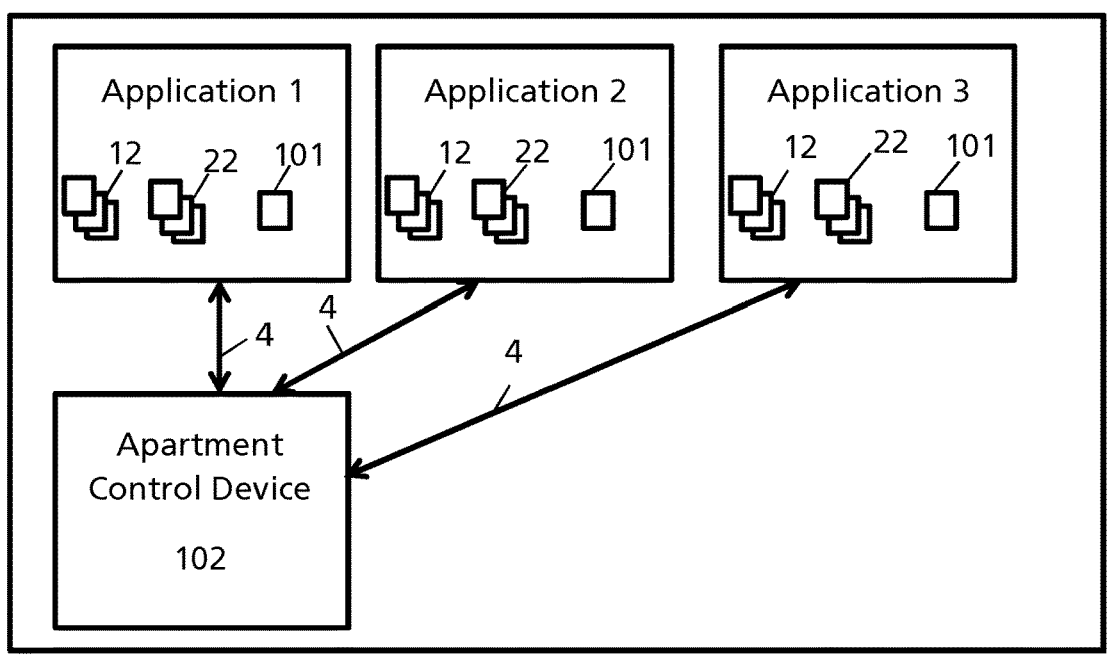
FIG. 2 shows an embodiment of a control structure of an apartment.

FIG. 2 shows an example of the control structure 100 for an apartment or a sub-unit. In this example the apartment comprises several applications such as, air conditioning, heating, cooling and others. In the apartment, each application comprises one or more actuator 12, one or more sensor devices 22 and an application control device 101. The application control device 101 controls the one or more actuators 12 and the one or more sensor devices 22 in the apartment according to a control logic for this application. Different applications have often distinct/independent conduit portions. The heating application normally has a different conduit portion for water than the conduit portion of the air conditioning application which conducts air. In one embodiment, the air conditioning application has two conduit portions and two sub-applications, one conduit portion for supply air and one conduit portion for exhaust air. All application control devices 101 are connected over the communication network 4 to an apartment control device 102 (sub-unit control device) which controls different application control devices 101 to obtain the control target of the apartment control device 102. The application control device 101 has the same reference number as the interface device 101 as they are often in the same device. Obviously, the interface device 101 and the application control device 101 can be in distinct devices.

Figure 3:
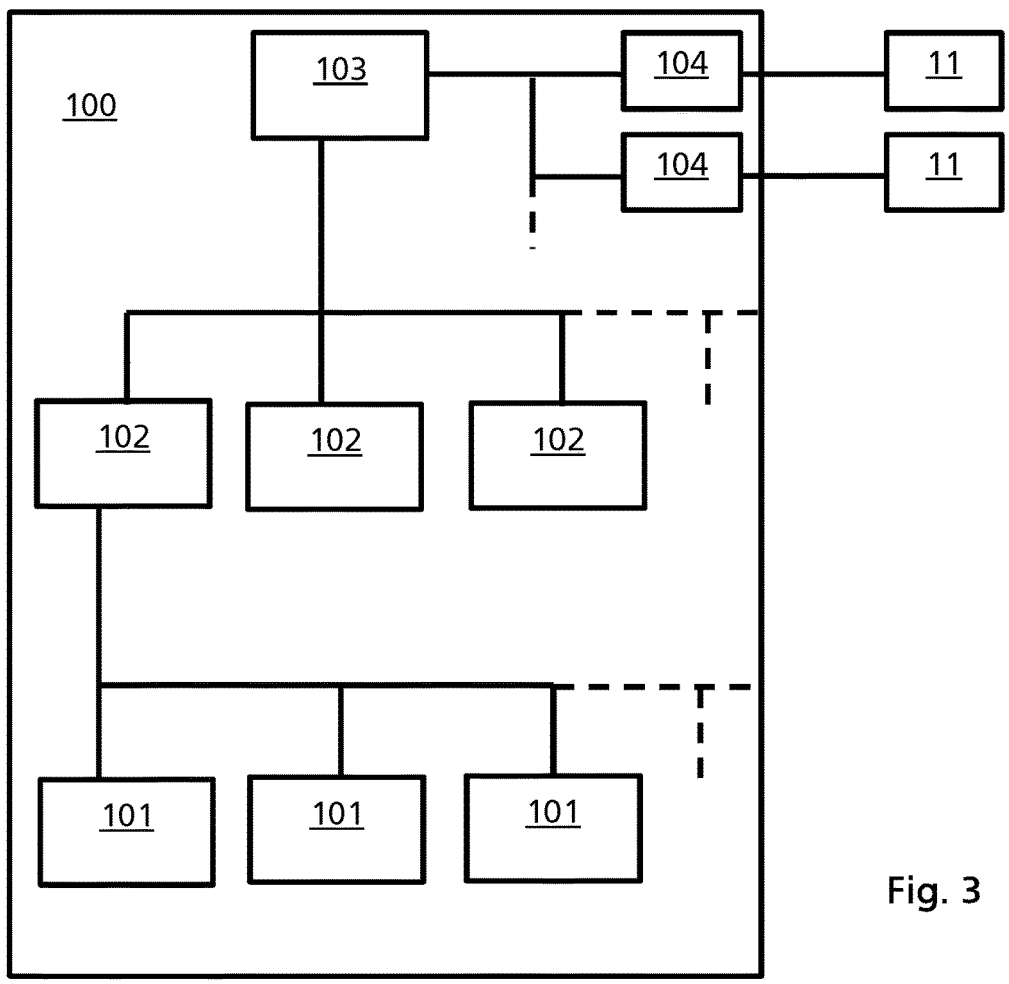
FIG. 3 shows an embodiment of a control structure of a building.

FIG. 3 shows an example control structure 100 for a building. A building control device 103 (or unit control device) is connected over the communication network 4 to a plurality of apartments or sub-unit control devices 102. The apartment control devices 102 are for example as described in FIG. 2. The building control device 103 normally controls the activity of the apartment control devices 102. In one embodiment, the building control device 103 further controls the flow generation device(s) 11. For example the flow generation device 11 is controlled such that the generated fluid flow in the conduit portion is sufficient for flow consumed in the unit connected to the flow generation device 11 over the conduit portion. If the building comprises multiple applications and/or necessitates multiple conduit portions, then there is provided respective multiple fluid flow generation devices 11. Preferably, the control structure comprises further a flow generation control device 104 connected between the building control device 103 and the fluid flow generation device 11. The flow generation control device 104 could contain control logic specific to the connected fluid flow generation device 11 so that different flow generation devices 11 are connected to different flow generation control devices 104. For example, the control logic for a pump for a heating system may be different to the control logic for a fan for a supply air. The flow control device 104 can as well be integrated in the building control device 104.

The control structure 100 needs the necessary configuration information in order to communicate with the HVAC devices and to control them. The configuration information includes, for example, for each HVAC device one or more of the following: network address, type of HVAC device, identifier, association to the correct control device 101, 102 or 103 of the control structure 100, association to the unit and/or sub-unit of the building structure and location in the building structure. The configuration information may further include the hierarchical relations between the HVAC devices, i.e. the assignments between the fluid control devices 11, 12, 13 and the sensor devices 21, 22 and/or the assignment of the HVAC devices to the corresponding control devices of the control structure 100.

Figure 4:
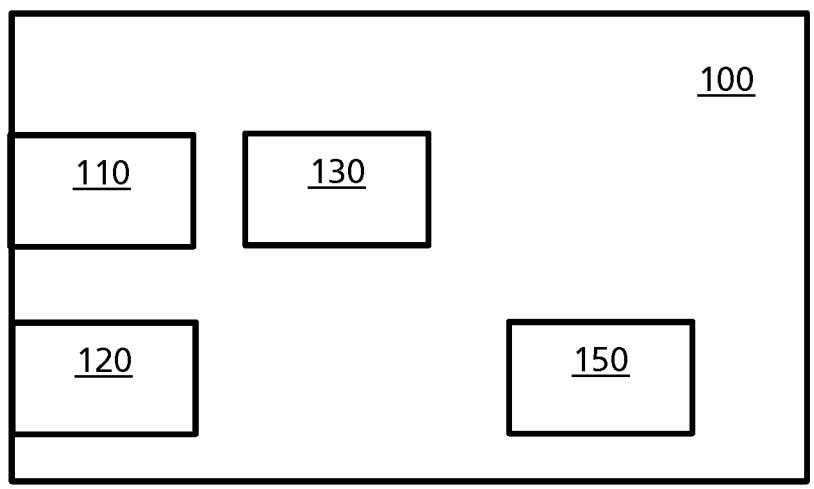
FIG. 4 shows an embodiment of functional sections of a control structure of the HVAC system.

FIG. 4 shows an embodiment of functional sections of the control structure 100. The control structure 100 has a network interface section 110 in order to communicate over the communication network 4 with the HVAC devices. Optionally, the control structure 100 has an interface 120 for reading registered information from a mobile device, as explained later. This interface 120 might be a NFC interface like Bluetooth, infrared, RFID, etc. However, the interface 120 might also be a WLAN connection or any other communication connection. The mobile device could also communicate over the communication network 4 as the HVAC devices described above. In one embodiment the control structure 100 further comprises an address section 130 for automatically assigning network addresses to the HVAC devices, as will be explained below. The control structure 100 comprises a configuring section 150 for automatically configuring the HVAC devices and the control devices, as explained in more detail below. The functions of sections 110, 120, 130 and 150 can be realized in software and/or hardware modules and can be realized in the same device or distinct devices.

Figure 5:
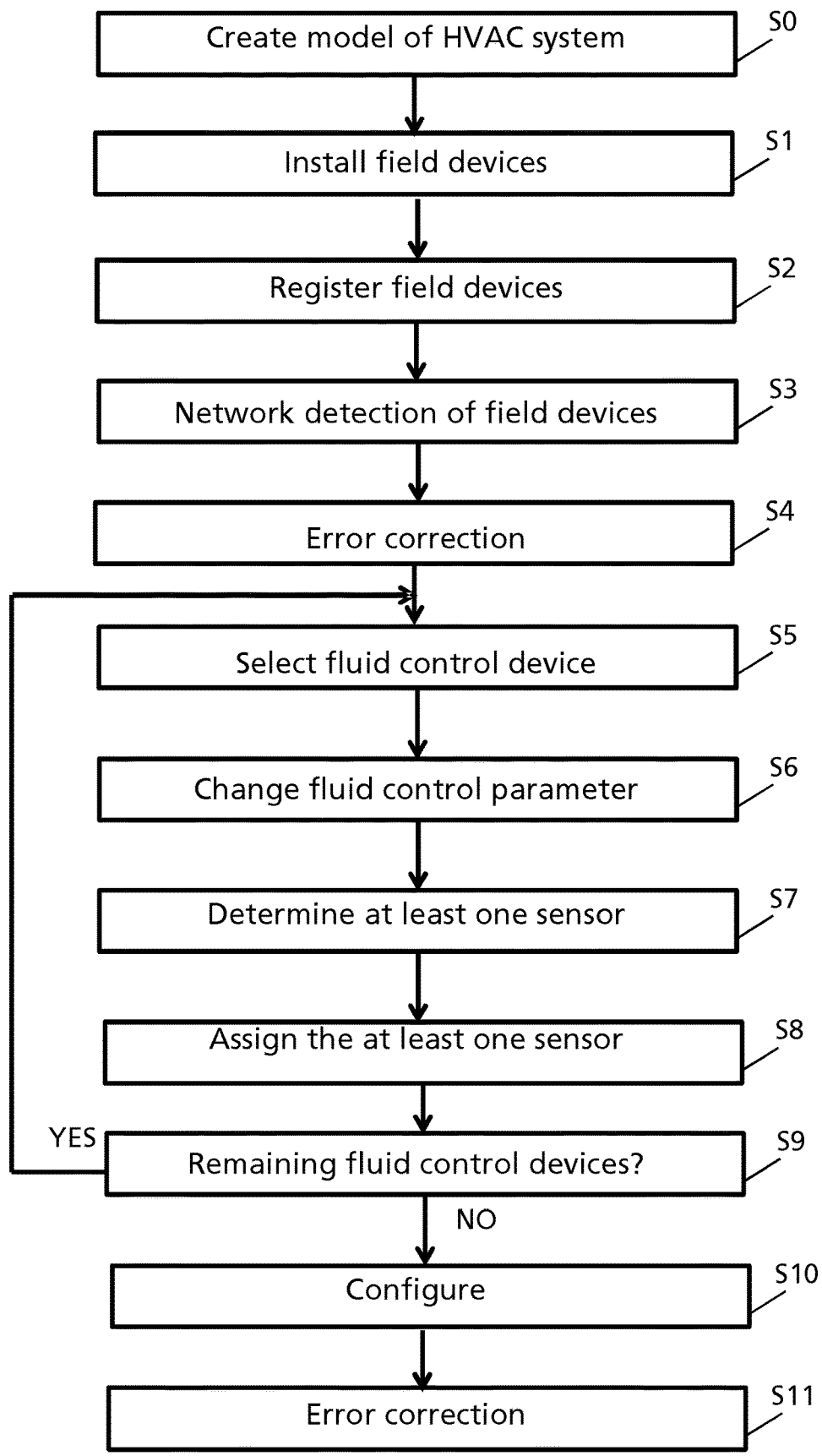
FIG. 5 shows an embodiment of a method for configuring the HVAC system.

FIG. 5 shows an exemplary embodiment of the method for commissioning the HVAC system.

In a step S0, a model of the HVAC system is created with all the HVAC devices to be installed in the building structure and the control structure 100. This model comprises one or more of the following information:

the fluid conduit system 3 with the conduit portions;

representations of the control devices of the control structure;

representations of the HVAC devices, preferably with representations of the fluid control devices 11, 12, 13 and of the sensor devices 21, 22;

assignments from each representation of a HVAC device to at least one representation of the control devices;

information about the units and/or sub-units of the building structure and the HVAC devices associated to these units and/or sub-units;

location information for each representation of the HVAC devices indicating the location of the corresponding HVAC device in the building structure;

arrangement information for each representation of the HVAC devices indicating the arrangement of the corresponding HVAC device in the fluid conduit system (3); and information about each HVAC device and/or control device like type of device, etc.

Such a model can be created at a remote computer and could be stored in the HVAC system or in a remote location which is also accessible from the configuring section 150.

In a step S1, the HVAC devices S1 are installed in the building structure.

In a second step S2, the HVAC devices are registered. This includes normally the identification of the HVAC device. This can be captured by reading the identifier of the HVAC device with a mobile device of a user (commissioning personal). The identifier could be an NFC tag in the HVAC device or a QR code shown on the HVAC device. The mobile device could be for example a smartphone, a tablet, a smart watch, smart glasses with display functions. This registration step can also be performed, when the HVAC devices installed are not yet powered. In one embodiment, the registration step includes also the registration of the location of the HVAC device in the building structure. This could be performed by a user input of the user on the mobile device or automatically, e.g. by an indoor navigation system, when the identifier of the HVAC device is read. With information about the location of the HVAC devices being available from a building information model, the assignment can be fully automatic. If not already existing, the user could create the indoor building structure necessary for the indoor navigation system during the registration step, e.g. by filming the indoor building structure during the registration process. In one embodiment, the registration step also includes the assignment of the HVAC device to a corresponding representation of the HVAC device in the model. The registration information is transferred to the configuring section 150. This can be realised by a near field communication between the mobile device and the interface 120 of the control structure 100, for example. The registration information is used in the configuring section 150. The registration step S2 could include the user input or the measurement of the location of the HVAC device. The location information of the representations of the HVAC devices in the model could be compared with the location of the HVAC device determined in the registration step S2 in order to automatically detect the assignment of the HVAC device registered to the corresponding representation of the HVAC device of the model. In an alternative embodiment, the registration step S2 could also be combined with step S3 such that the information about the HVAC devices is transferred over the communication network to the control structure 100. The location of the HVAC devices in the building structure could be detected in the HVAC devices by a positioning system like GPS or WLAN triangulation for example.

In a third step S3, an address section automatically assigns the network addresses to the HVAC devices. This requires that the HVAC system is powered. The assigned network addresses are sent to the configuration section. The HVAC devices send their identifier to the configuring section 150 such that the configuring section 150 can identify and address each HVAC device. Alternatively, this step S3 could also be performed manually as described in U.S. Pat. No. 6,667,690.

In step S4, it can be checked if there has been an error detected in the installation of the HVAC devices. For example, a HVAC device registered in step S2 which is not detected in the network S3 must have some installation problem and a user is typically sent to the HVAC device to check the problem, e.g. the network connection or the power. Other errors might be detected by the HVAC device itself and might be communicated to the control structure 100 over the network 4. For example, the HVAC device could detect that its wiring is not correct. Some errors might be detected from a picture taken from the HVAC device, e.g. during the installation step S1 or the registration step S2. Optical means of the HVAC device could indicate a certain error which can be detected in the control structure 100 on the basis of the picture of the HVAC device. The optical means could be a control lamp or a combination of control lamps which show an error detected in the HVAC device. Another reason for detecting an error could be the number of actuators 12 or sensor devices 12, 21 per room, zone or sub-unit. For example, if the number is different than in the room, zone or sub-unit of the corresponding model. When an error has been detected, the control structure 100 could send information to a mobile device of a user (not necessarily the same as the mobile device of the user performing the registration process) indicating that an error has been detected and any other information which can assist the user to take the necessary steps to resolve the error. For example, the user could be navigated in the indoor navigation system in the building structure, to the location of the HVAC device which has the error. The navigation could include at least in part some augmented reality functions. Augmented reality functions means that the pictures of the camera of the mobile device are displayed in real time on the screen of the mobile device with augmented information displayed in those pictures. This augmented information could be a navigation direction, where to go in order to find the HVAC device with the error. This augmented information could be a location in the room, where the HVAC device is installed (this information could have been registered in the registration step S2). This augmented information could be the kind of error detected. This augmented information could be an instruction what to do to overcome the error. The instruction could be retrieved on the basis of the picture of the HVAC device taken previously, e.g. at the installation S1 or registration process S2.

The given order of the steps S0 to S4 is preferred, but not obligatory. For example, the model could theoretically also be created in step S0 after the installation of the HVAC devices in step S1. The installation step S1 and the registration step S2 could be performed at the same time.

In steps S5 to S9 the relations or assignments between the fluid control devices 11, 12, 13 and the sensor devices 21, 22 are automatically retrieved by a configuring section 150.

In step S5, one fluid control device is selected. The selection of the fluid control device is performed on the basis of the knowledge which is already present. Said knowledge which is already present is for example the information about the type of fluid control device (Especially for the first selected fluid control device). Alternative or additional information would be the assignment information already determined for other HVAC devices and/or the location information of the HVAC devices. Preferably, only one fluid control device is selected for varying the fluid control parameters. However, it is also possible to select two or more fluid control devices for changing their fluid control parameters together/at the same time.

In step S6, the fluid control parameter of the selected fluid control device is changed or varied. Preferably, the change is from a first value which is at a border of a typical range to a second value at the other border of the typical range of the fluid control parameter in order to facilitate the detection of the change of the parameter in the sensor devices. Preferably, the remaining fluid control devices of the same type are kept to the first extreme value. For a selected fluid flow generation device 11, the amount of flow is changed. For example, all fluid flow generation devices 11 are switched off and the selected fluid flow generation device 11 is switched on (or vice versa). Preferably, all actuators 12 are fully or at least partially opened in order to detect the change at the sensor devices 22. For a selected actuator, the actuator position is varied, preferably from open position to a closed position (or vice versa). Preferably, all other actuators 12 are fully or at least partially opened (or closed) in order to detect the change at the sensor devices 22.

In step S7, a variation of a sensor parameter at at least one of the sensor devices 21, 22 caused by the variation of the fluid control parameter is determined. Most preferably a "change" or a "variation" of the sensor parameter means a change of the sensor parameter which is significant enough to be caused by the variation of the fluid control parameter of the selected fluid control device. In one embodiment, all sensor parameters of all sensor devices 21, 22 could be checked, if they have changed. In another embodiment, the number of sensor devices for which a variation of the sensor parameter must be sensed can be restricted by excluding all sensor devices which measure sensor parameters not influenced by the variation in the fluid control parameter and/or by excluding all sensor devices for which it is already known that they are not downstream of the selected fluid control device 11, 12, 13. For example for a selected fluid flow generation device, all the sensor devices downstream from the selected fluid flow generation device 11 will detect a change (an increase) in the fluid flow.

In step S8, the at least one sensor device determined is assigned to the selected fluid control device and/or to the corresponding at least one representation of the sensor devices in the model.

In step S9, it is checked if there are remaining fluid control devices which have not yet sensor devices assigned. If yes, the steps S5 to S8 are repeated for each selection of fluid control device(s). If no, the method continues with step S10.

Normally the selection starts with the fluid flow generation devices. This allows to group all sensors belonging the conduit portion of one of the fluid flow generation device. If there is further information necessary for the assignment of an actuator 12 to a sensor device 22, the actuators 12 (for which this assignment is not known) are subsequently selected in step S5 to detect to which sensor device the actuator 12 belongs. Often the assignment of the actuator 12 to the sensor device 22 is known, because they are integrated in the same device or because they are connected by a field bus.

In step S10, the configuration of the control structure 100 and/or the HVAC system is performed on the basis of the assignments determined in the previous steps.

In one embodiment, the configuration section 150 knows the model of the HVAC system. This model contains information about at least some of: the conduit system 3, all the HVAC devices of the HVAC system, the arrangement of the HVAC devices in the conduit system 3, the types of all HVAC devices, the association of each HVAC device to a unit, sub-unit and/or zone of the building structure and the location in the building structure.

In one embodiment, the HVAC devices are grouped. All the sensor devices 22 assigned in step S5 to S9 to one fluid flow generation device 11 are grouped in the same group of the corresponding fluid flow generation device 11. All fluid control devices, in particular all actuators 12, assigned in step S5 to S9 to the sensor devices 22 which was grouped to one fluid flow generation device are grouped to the same fluid flow generation device. This allows to assign the HVAC devices of this group to a certain (HVAC) application based on the information available for the fluid flow generation device 11, the type of HVAC devices, the sensor parameters of the sensor devices 21, 22 and/or based on the structure of the HVAC devices of this group. The structure of the HVAC devices of a group can be one or more of: the number of HVAC devices, the type of the HVAC devices and the assignments between the fluid control devices 11, 12, 13 and the sensor devices 21, 22. When comparing the structure of the HVAC devices of a group to the model of the HVAC system, a corresponding group of HVAC devices of the same application can be detected in the model. Thus, it is possible to assign the group of HVAC devices to a specific group of HVAC devices in the model.

In one embodiment, the group of HVAC devices is divided in sub-groups based on the assignments of the fluid control devices 12, 13 to the sensor devices 21, 22. The sub-groups can then be assigned to corresponding units, sub-units and/or zones of the building structure. This can be realized by comparing the structure of the HVAC devices of a sub-group to a corresponding structure of HVAC devices of sub-groups of the model. The structure of the HVAC devices of a sub-group can be one or more of: the number of HVAC devices, the type of the HVAC devices and the assignments between the fluid control devices 12, 13 and the sensor devices 21, 22. The model contains the information of the unit, sub-unit and/or zones related to each group and/or sub-group of HVAC devices. Thus, it is possible to assign the sub-group of HVAC devices to a specific group of HVAC devices in the model and determine the unit, sub-unit and/or zone related to the HVAC devices.

In one embodiment, the HVAC devices of a sub-group are assigned to the application control device 101 corresponding to the sub-unit to which the sub-group was assigned and corresponding to the application to which the group (of the sub-group) was assigned. In one embodiment, the HVAC devices of a sub-group are assigned to the sub-unit control device 102 corresponding to the sub-unit to which the sub-group was assigned. The sub-unit control devices 102 can then be assigned to the unit control device 103 of the unit containing the respective sub-unit.

With this method, all HVAC devices can be assigned to the corresponding HVAC devices of the model and then to the corresponding control devices of the control structure 100.

Only if there are two or more units or sub-units with identical structure of HVAC devices for an application, then the group and/or sub-group of HVAC devices must be manually assigned to the correct unit, sub-unit or zone. In one embodiment, the location of the HVAC devices in the building structure is used to assign the HVAC devices to the correct unit and/or sub-unit of the building structure. This allows to avoid a manual assignment of ambiguous (sub-) groups of HVAC devices. The location of the HVAC devices could be determined in the registration step S2 as described above. The location could also be determined by the HVAC device itself, for example by means of a radio triangulation method like GPS or WLAN-triangulation or GSM triangulation. In one embodiment, the model also contains the location of the HVAC devices in the building structure. This further improves the detection quality, because the location of HVAC devices determined can be compared with the location of HVAC devices of the model.

In one embodiment, the configuration comprises the assignment of the HVAC devices to the corresponding control devices of the control structure 100. For example, the actuators 12 and the sensor devices 22 in an apartment as shown in FIG. 2 must be assigned to the corresponding application control device 101 of the corresponding apartment. The application control devices 101 of one apartment must be assigned to the same apartment control device 102. The apartment control devices 102 of the same building must be assigned to the same building control device 103. This can be realized as described above.

In one embodiment, the assignments and/or the hierarchical structure are/is used to automatically configure the control device 100.

In one embodiment, assignments and/or a structure of HVAC devices received from a user input (e.g. in step S2) is compared to the assignments and/or the structure of HVAC devices determined from steps S5 to S9 or S10. This allows to quickly detect errors in the information received from the user. In this case, in step S11, the detected error could be corrected. This could be performed automatically by correcting the corresponding assignments. This could be realised by sending a message to the user pointing out the difference between the user input and the automatically retrieved assignments. This could be also done by sending the user to the HVAC device for which the error has been detected and to correct the error locally. The error correction could use augmented reality functions, like navigation information to navigate the user, through the building structure, to the HVAC device for which the error has been detected and to show the user the actuator device even if the device is for example hidden behind a suspended ceiling.

In one embodiment, the configuring section 150 receives the assignments of HVAC devices connected to a field bus 5 which is connected over the communication network 4 to the control structure 100 from a device connected to the field bus 5.

What is claimed is:

1. A method for an HVAC system of a building structure with a control structure, a fluid conduit system, a communication network and a plurality of HVAC devices connected over the communication network to the control structure, wherein the plurality of HVAC devices comprises fluid control devices and sensor devices, wherein the control structure has a plurality of control devices, wherein a configuring section has access to a model of the HVAC system stored in memory and containing representations of HVAC devices, representations of the control devices, and assignments between the representations of HVAC devices and the representations of the control devices, wherein the representations of the HVAC devices comprise representations of the fluid control devices and representations of the sensor devices, wherein the method comprises the steps:
   a) the configuring section causes one of the fluid control devices to vary a fluid control parameter;
   b) determine, in the configuring section, a variation of a sensor parameter at at least one of the sensor devices caused by the variation of the fluid control parameter;
   c) detect, in the configuring section, at least one of the representations of the sensor devices in the model corresponding to the at least one of the sensor devices determined;
   d) assign, in the configuring section, at least one of the control devices to the at least one of the sensor devices determined, the at least one of the control devices corresponding to at least one of the representations of the control devices
      assigned in the model to a representation of the at least one of the sensor devices corresponding to the at least one of the sensor devices determined and/or
      assigned in the model to a representation of the one of the fluid control devices for which the fluid control parameter has been varied,
   wherein the configuring section receives a user input, wherein the configuring section performs the following steps:
      comparing the assignments from the configuring section with the user input determining a configuration error on the basis of the comparing;
      informing a user about the configuration error and instructing the user to correct the assignments based on the configuration error, and/or correcting the assignments based on the configuration error; and
      controlling the plurality of HVAC devices based on the corrected assignments.

2. The method according to claim 1, wherein the at least one of the sensor devices whose sensor parameter variations has been determined in step (b), is arranged in the fluid conduit system.

3. The method according to claim 1, wherein the sensor parameter is indicative for a fluid volume flow in the fluid conduit system.

4. The method according to claim 1, wherein the step c) comprises comparing, in the configuring section, the determined at least one of the sensor devices and the one of the fluid control devices with the model in order to detect the representation of at least one of the sensor devices corresponding to the at least one of the sensor devices determined and the representation of the one of the fluid control devices corresponding to the one of the fluid control devices.

5. The method according to claim 1, wherein the fluid control devices comprise a first fluid flow generation device for generating a fluid flow in a first conduit portion of the fluid conduit system, wherein the sensor devices comprise a first group of sensor devices arranged in the first conduit portion, wherein the representations of the fluid control devices comprise representations of the first fluid flow generation device, wherein the steps a) to d) correspond to the following steps:
   a) the configuring section causes the first fluid flow generation device to vary a fluid control parameter;
   b) determine, in the configuring section, a variation of a sensor parameter in the first group of sensor devices caused by the variation of the fluid control parameter of the first fluid flow generation device;
   c) detect, in the configuring section, the representations of sensor devices corresponding to the first group of sensor devices by comparing the first group of sensor devices with the model;
   d) assign, in the configuring section, the first group of sensor devices to at least one of the control devices corresponding to at least one representation of control devices assigned in the model to the first group of sensor devices and/or assigned in the model to the first fluid flow generation device.

6. The method according to claim 5, wherein the fluid control devices comprise a first group of actuators arranged in the first conduit portion, wherein each actuator of the first group of actuators is related to at least one of the first group of sensor devices, wherein the configuring section assigns the each of the first group of actuators to the at least one control device which is assigned to the at least one of the first group of sensor devices to which the each actuator is related.

7. The method according to claim 6, wherein the method comprises for the actuators of the first group of actuator for which the related sensor device is not known the following steps:
   the configuring section causes the actuator to vary a fluid control parameter;
   determine, in the configuring section, a variation of a sensor parameter at at least one of the sensor devices caused by the variation of the fluid control parameter of the actuator;
   determine, in the configuring section, a sensor device of the first group of sensor devices related to the actuator based on the determined at least one of the sensor devices.

8. The method according to claim 5, wherein the fluid control devices comprise a second fluid flow generation device for generating a fluid flow in a second conduit portion of the fluid conduit system, wherein the sensor devices comprise a second group of sensor devices arranged in the second conduit portion, wherein the representations of the fluid control devices comprise representations of the second fluid flow generation device, wherein the method comprises further the following steps:

the configuring section causes the second fluid flow generation device to vary a fluid control parameter;

determine, in the configuring section, a variation of a sensor parameter in the second group of sensor devices caused by the variation of the fluid control parameter of the second fluid flow generation device;

detect, in the configuring section, the representations of sensor devices corresponding to the second group of sensor devices;

assign, in the configuring section, the second group of sensor devices to at least one of the control devices corresponding to at least one representation of control devices assigned in the model to the second group of sensor devices and/or to the second fluid flow generation device.

9. The method according to claim 5, wherein the first group of sensor devices and/or the first fluid flow generation device is assigned to a corresponding unit of the building structure and/or application based on one or more of the following:

the information about the first fluid flow generation device and/or the first group of sensor devices, the number of the first group of sensor devices and/or the first group of actuators, and the structure of the first group of sensor devices and/or the first group of actuators.

10. The method according to claim 1, wherein the user input comprises the location of the HVAC devices and/or assignments between HVAC devices and their control devices of the control structure.

11. The method according to claim 1, wherein the user input is performed by mobile device registering each HVAC device by reading an identification code of the each HVAC device by a near field communication or by capturing an image of the identification code of the HVAC device.

12. The method according to claim 1, wherein the step of informing the user about the configuration error comprises a step of guiding the user in an augmented reality of at least a part of the building structure how to overcome the configuration error.

13. A non-transitory computer readable medium having instructions for executing a computer program stored thereon, that when executed on a processor, causes a computer to perform the steps of the method of claim 1.

14. An HVAC system for a building structure with a control structure, a fluid conduit system, a communication network and a plurality of HVAC devices connected over the communication network to the control structure, wherein the plurality of HVAC devices comprises fluid control devices and sensor devices, wherein the control structure has a plurality of control devices, wherein a configuring section has access to a model of the HVAC system stored in memory and containing representations of HVAC devices, representations of the control devices, and assignments between the representations of HVAC devices and the representations of the control devices, wherein the representations of the HVAC devices comprise representations of the fluid control devices and representations of the sensor devices, wherein the HVAC system comprises the configuring section configured to:

a) cause one of the fluid control devices to vary a fluid control parameter;

b) determine a variation of a sensor parameter at at least one of the sensor devices caused by the variation of the fluid control parameter;

c) detect at least one of the representations of the sensor devices corresponding to the at least one of the sensor devices determined;

d) assign at least one of the control devices to the at least one of the sensor devices determined, the at least one of the control devices corresponding to the at least one of the representations of the control devices assigned in the model to a representation of the at least one of the sensor devices corresponding to the at least one of the sensor devices determined and/or assigned in the model to a representation of the one of the fluid control devices for which the fluid control parameter has been varied, wherein the configuring section receives a user input, wherein the configuring section performs the following steps:

comparing the assignments from the configuring section with the user input;

determining a configuration error on the basis of the comparing;

informing a user about the configuration error and instructing the user to correct the assignments based on the configuration error, and/or correcting the assignments based on the configuration error; and controlling the plurality of HVAC devices based on the corrected assignments.

\* \* \* \* \*